United States Patent
Chan et al.

(10) Patent No.: US 9,584,331 B2
(45) Date of Patent: Feb. 28, 2017

(54) METHODS AND SYSTEMS FOR TRANSMITTING BROADCAST DATA

(71) Applicant: Pismo Labs Technology Limited, Hong Kong (HK)

(72) Inventors: Ho Ming Chan, Hong Kong (HK); Chi Pan Yip, Hong Kong (HK); Kam Chiu Ng, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 0 days.

(21) Appl. No.: 14/369,719

(22) PCT Filed: Oct. 28, 2013

(86) PCT No.: PCT/IB2013/059701
§ 371 (c)(1),
(2) Date: Jun. 30, 2014

(87) PCT Pub. No.: WO2015/063538
PCT Pub. Date: May 7, 2015

(65) Prior Publication Data
US 2015/0304116 A1      Oct. 22, 2015

(51) Int. Cl.
*H04L 12/46* (2006.01)
*H04L 12/18* (2006.01)
*H04W 28/02* (2009.01)

(52) U.S. Cl.
CPC .......... *H04L 12/18* (2013.01); *H04L 12/4633* (2013.01); *H04W 28/02* (2013.01)

(58) Field of Classification Search
None
See application file for complete search history.

(56) References Cited

U.S. PATENT DOCUMENTS

| 8,677,423 B2* | 3/2014 | Hicks, III | H04H 20/63 725/39 |
| 2004/0057430 A1* | 3/2004 | Paavolainen | H04L 12/1836 370/390 |

(Continued)

FOREIGN PATENT DOCUMENTS

| CN | 102572007 A | * | 7/2012 | ........... H04L 69/167 |
| CN | 102572007 A | | 7/2012 | |

(Continued)

OTHER PUBLICATIONS

International Search Report in International Application No. PCT/IB2013/059701, mailed on Jul. 28, 2014.

(Continued)

*Primary Examiner* — David Oveissi

(57) ABSTRACT

A method carried out by a first communication gateway for transmitting broadcast data. Broadcast data is first received through a first network interface. The first communication gateway determines whether the broadcast data satisfies at least one condition, and forwards the broadcast data through at least one tunnel and through a second network interface to a second communication gateway if the broadcast data satisfies the at least one condition. The broadcast data is encapsulated in at least one encapsulating packet and the at least one encapsulating packet is decapsulated by the second communication gateway in order to retrieve the broadcast data. The broadcast data is then distributed by the second communication gateway to a second network.

20 Claims, 10 Drawing Sheets

(56) References Cited

U.S. PATENT DOCUMENTS

| | | | |
|---|---|---|---|
| 2005/0044068 A1* | 2/2005 | Lin | H04L 63/164 |
| 2005/0125542 A1* | 6/2005 | Zhu | H04L 63/16 |
| | | | 709/227 |
| 2008/0267196 A1* | 10/2008 | Menth | H04L 12/4633 |
| | | | 370/401 |
| 2009/0016349 A1* | 1/2009 | Cha | H04N 7/1675 |
| | | | 370/392 |
| 2010/0165881 A1* | 7/2010 | Hof | H04L 45/02 |
| | | | 370/254 |
| 2010/0250753 A1* | 9/2010 | Song | H04W 36/0011 |
| | | | 709/227 |
| 2012/0079551 A1* | 3/2012 | Isozaki | H04N 21/4104 |
| | | | 725/118 |
| 2012/0259994 A1* | 10/2012 | Gillies | H04L 12/1881 |
| | | | 709/231 |

FOREIGN PATENT DOCUMENTS

| | | |
|---|---|---|
| CN | 102958035 A | 3/2013 |
| WO | 2013015982 A1 | 1/2013 |

OTHER PUBLICATIONS

Written opinion of the International Searching Authority in International Application No. PCT/IB2013/059701, mailed on Jul. 28, 2014.

* cited by examiner

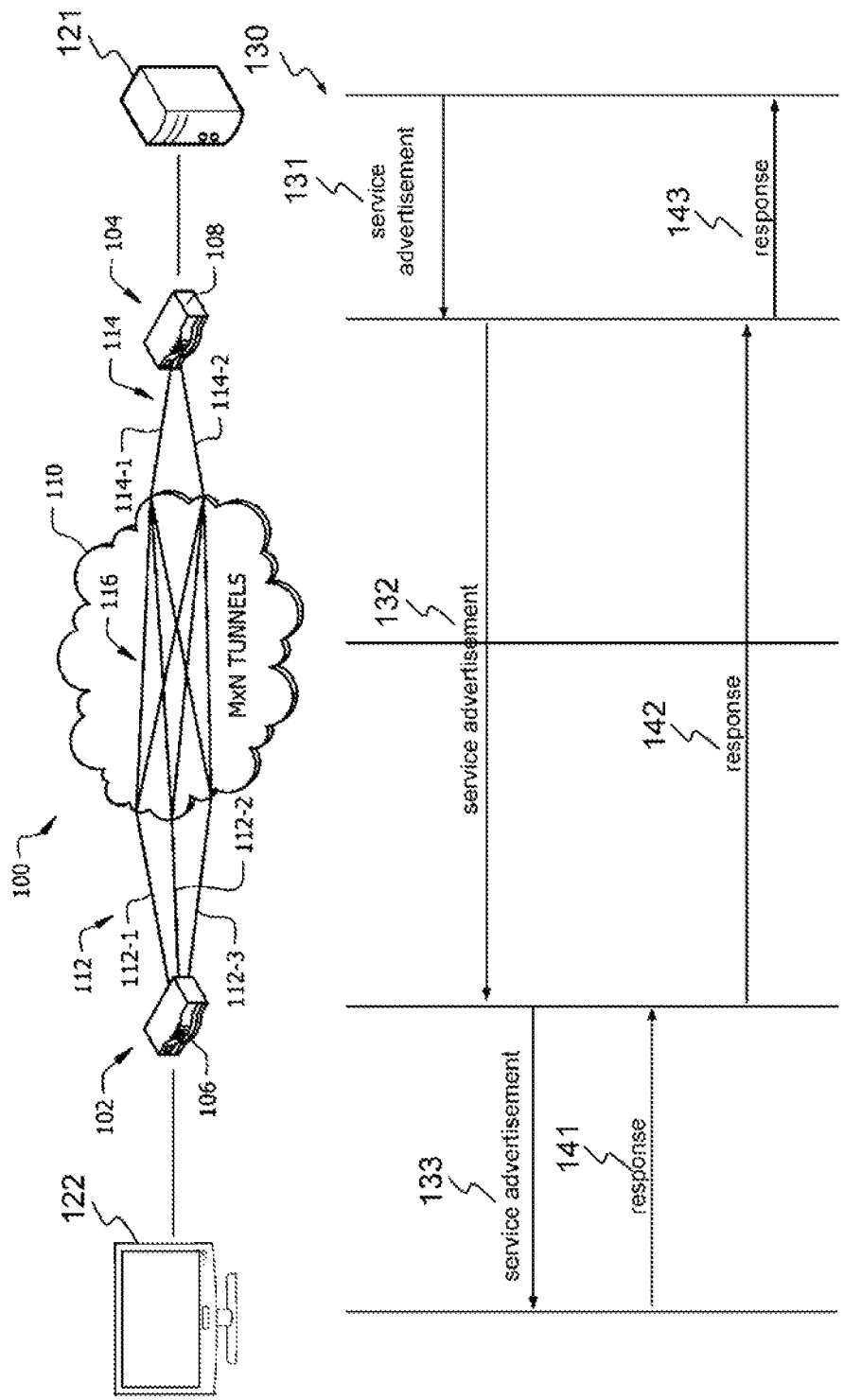

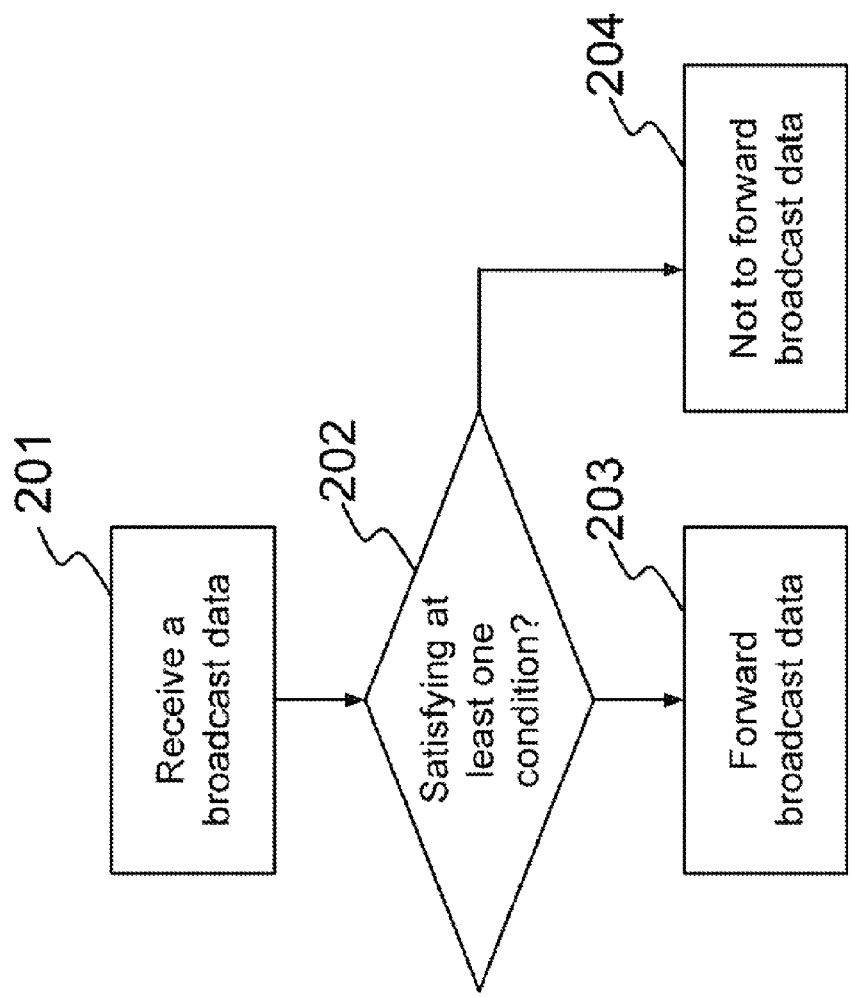

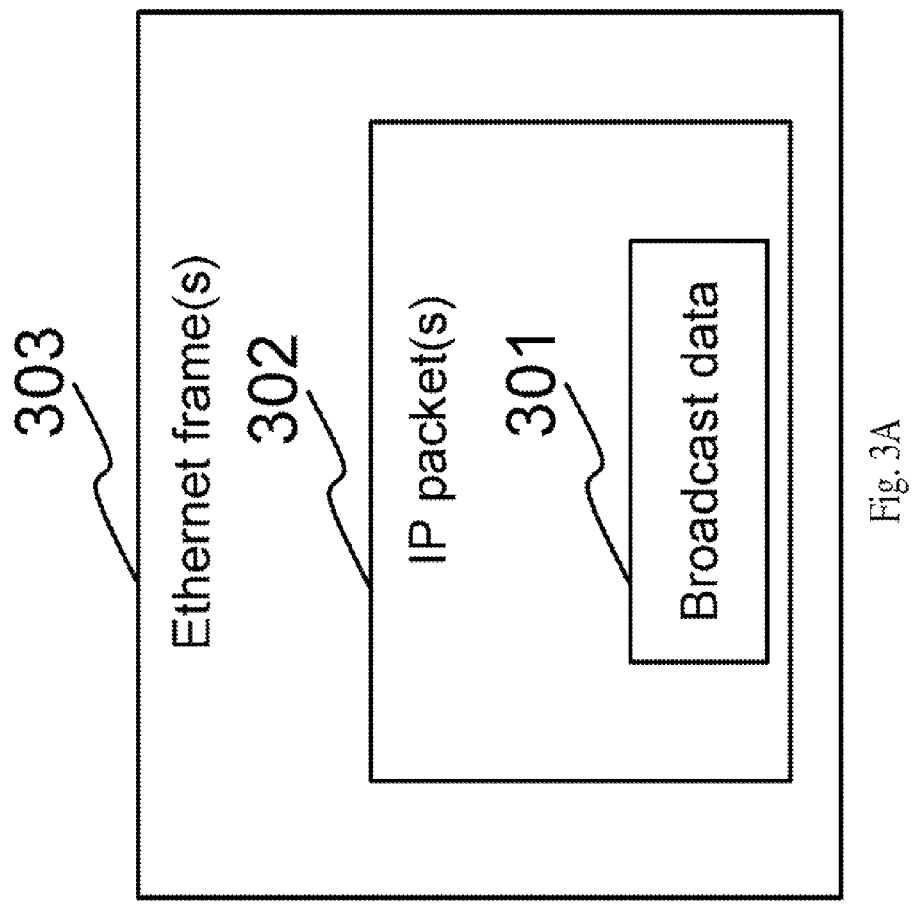

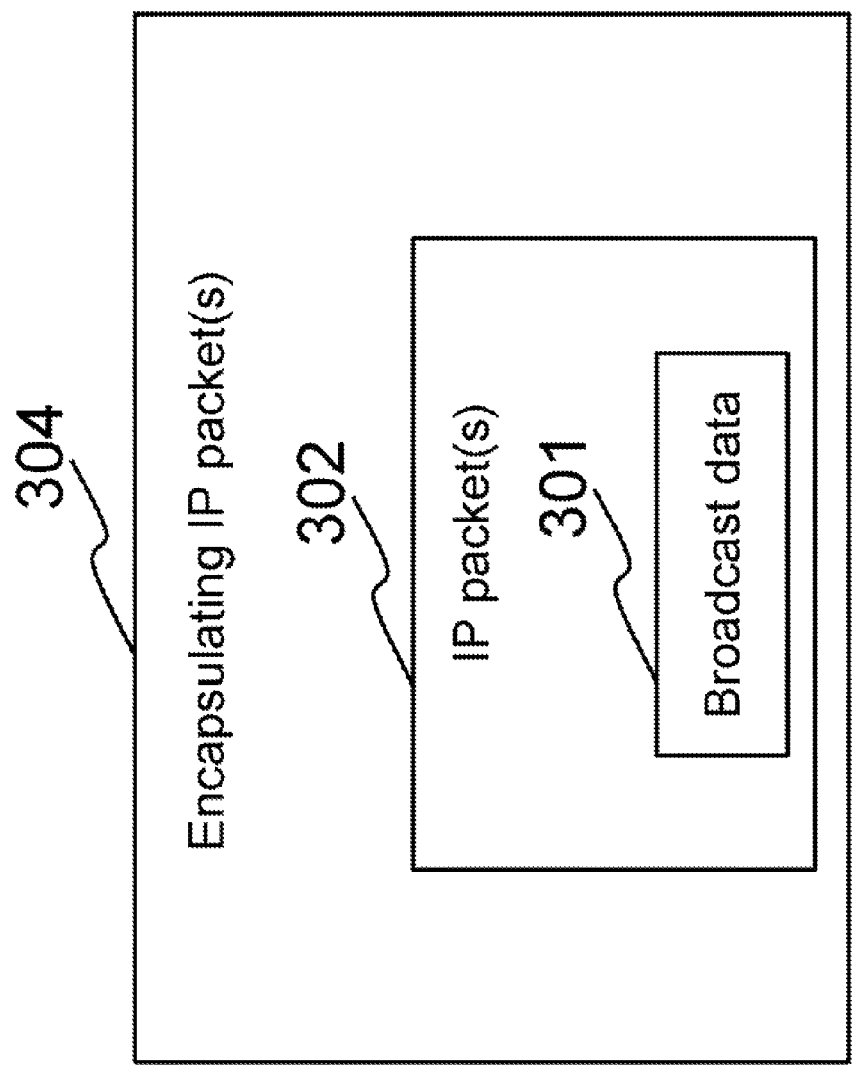

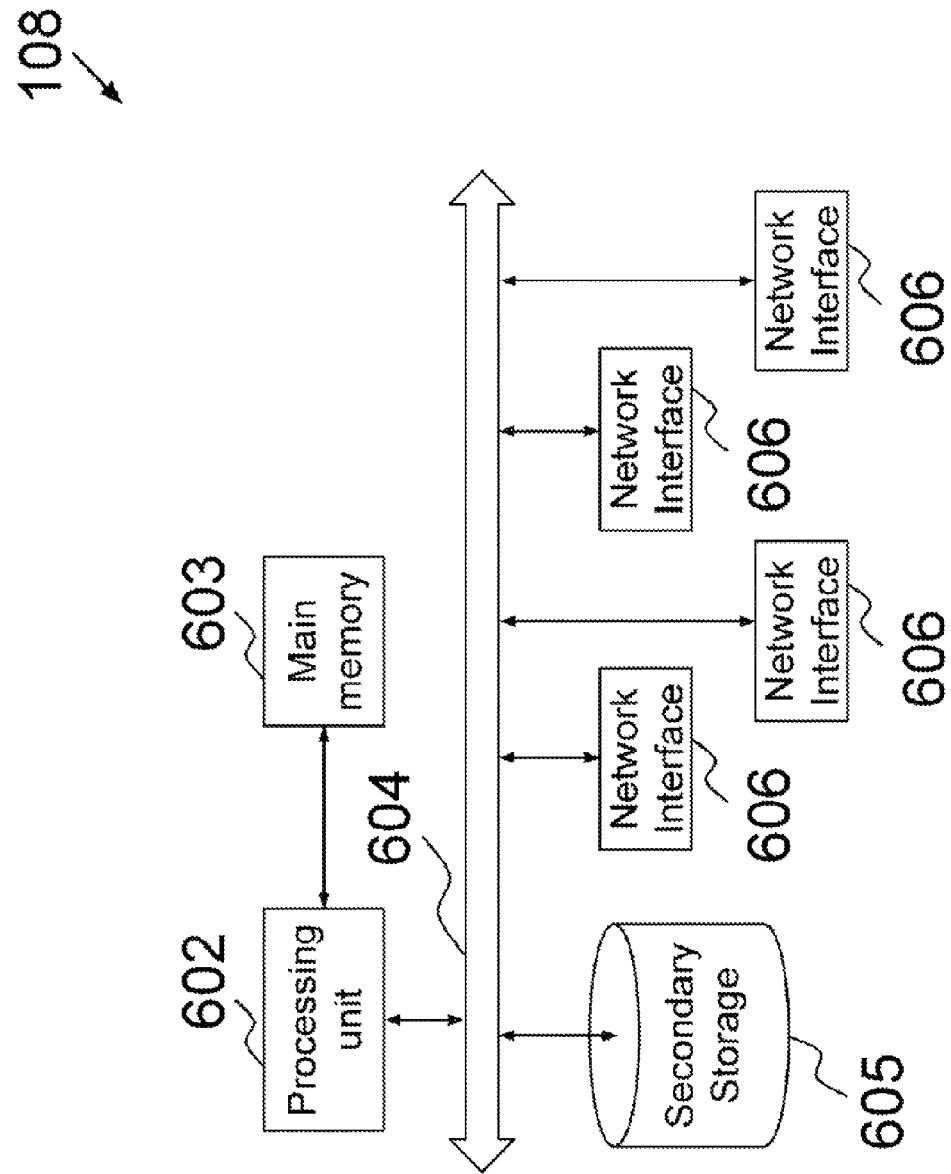

METHODS AND SYSTEMS FOR TRANSMITTING BROADCAST DATA

TECHNICAL FIELD

The present invention relates in general to the field of computer networks. More particularly, the present invention relates to methods carried out by a communication gateway for transmitting broadcast data. When the communication gateway receives the broadcast data, it determines whether the broadcast data satisfies at least one condition. If the broadcast data satisfies the at least one condition, the communication gateway encapsulates the broadcast data in at least one encapsulating packet and forwards the encapsulated broadcast data to another communication gateway.

BACKGROUND ART

Bonjour is a zero configuration network multicast Domain Naming System protocol used by devices developed by Apple Inc. to enable the automatic and easy discovery of computers, devices, and services on Internet Protocol (IP) networks. Bonjour (like other multicast services, such as Microsoft's UPnP) uses industry standard IP protocols to allow devices to automatically discover each other without the need to enter IP addresses or configure DNS servers. This brings simplicity and ease-of-use to the users of network devices and services. Eliminating the need to set up services such as Dynamic Host Configuration Protocol, DNS, and DNS Service Directory, Bonjour enables each device to continuously publish and discover services. By broadcasting Bonjour service messages, printers, servers, and other shared devices can advertise the services they offer. Client devices then monitor Bonjour advertisements and connect to the appropriate servers, as with any other service. The protocol also allows for a device to request services (Service Discovery) on the network as well as respond to incoming requests. A single device can be both a client and a server at the same time. The automatic discovery makes it easy for clients to easily use services offered by another device or server.

On the downside, Bonjour generates a lot of network traffic. During the Service Discovery process, when a device is browsing for services, it sends queries to discover whether a particular service is available in a network or in a domain. It issues an initial query and then sends subsequent queries exponentially less often, after 1 second, 2 seconds, 4 seconds, 8 seconds, and so on, at up to a maximum interval of one hour. Likewise, when a service starts up on the network, it announces its presence with the same exponential back-off algorithm. In a network that are connected through public networks, private networks, tunnels, or virtual private networks (VPN) the amount of such traffic can be substantial. With hundreds or thousands of Apple clients on a network, multicast traffic quickly swells to startling percentages.

The other problem with Bonjour (and similar multicast services) is that the broadcast of service advertisements are only seen by devices within a single subnet or Virtual Local Area Network (VLAN). Therefore in an enterprise with a large multi-VLAN network, the Bonjour traffic will not span across VLANs. This means Bonjour devices like printers in one VLAN cannot be used by client device in another VLAN.

As a result, when two networks are connected together or when one host is connected to another network through IP based tunnel, multicast data, such as data from Bonjour Protocol, are usually blocked in order to reduce network traffic. The blocking of this multicast data creates inconvenience to users and hosts as users and hosts are unable to receive multicast data originated from another network.

Internet Engineering Task Force (IETF) Request For Comments (RFC) 6513 has disclosed a method to relay IP based multicast data to different networks through tunnels and/or MPLS technologies. IETF RFC 6513 specifics special protocols and procedures how multicast traffic within a BGP/MPLS IP VPN travels from one VPN site to another.

Cisco has disclosed, a Bonjour Gateway, by caching Bonjour advertisements from one or more source/host and responding back to Bonjour clients when the Bonjour clients ask for or request a service. The solution disclosed by Cisco requires the Bonjour Gateway to understand Bonjour protocol in order to cache. Bonjour traffic and make request or reply on behalf of other Bonjour protocol capable devices. The Bonjour Gateway acts like a proxy.

Another method is to use specifically configured DNS server to provide IP based multicast data to different networks. However, not all networks are allowed to have specifically configured DNS server.

If the multicast data-link layer data is non-discriminatorily being transmitted, routed or forwarded from one network to another network, the capacity of the tunnel may be consumed by the multicast data-link layer data. Therefore, intelligent methods are required to be implemented at the gateway or router in order to allow multicast data being transmitted, routed or forwarded discriminatorily while not consuming too much network resources.

DISCLOSURE OF INVENTION

Summary of Invention

According to one of the embodiments of the present invention, a first gateway allows broadcast data from a first network to be transmitted through at least one tunnel to a second host or a second network. The first gateway acts as a bridge at the data-link layer of the Open Systems Interconnection (OSI) model in the first network. The first gateway encapsulates the broadcast data in one or more encapsulating Internet Protocol (IP) packets and then transmits the one or more encapsulating IP packets to the second host or a second gateway of the second network. In one particular embodiment, the first gateway acts as a router in the first network and routes all IP packets that are multicast IP packets and/or contain data-link broadcast data. In one particular embodiment, the broadcast data must satisfy at least one condition in order for the first gateway to transmit it through the tunnel.

According to one of the embodiments of the present invention, the broadcast data belongs to network layer of the OSI model. According to one of the embodiments of the present invention, the broadcast data belongs to data-link layer of the OSI model.

According to one of the embodiments of the present invention, encapsulating IP packet(s) encapsulates one or more frames or packets containing broadcast data belonging to network layer of the OSI model. According to one of the embodiments of the present invention, encapsulating IP packet(s) encapsulates one or more broadcast data belonging to data-link layer of the OSI model. In one particular embodiment, when encapsulating IP packet(s) encapsulates one or more frames or packets containing broadcast data belonging to data-link layer of the OSI model. The broadcast data is extracted by the first gateway and was originally encapsulated by one or more network layer packets, from network layer packet(s).

According to one of the embodiments of the present invention, the condition for first gateway to determine whether data-link layer broadcast data should be transmitted through the at least one tunnel to the second host or the second network is based, at least in parts, on address of data-link frame, the port number of an IP packet encapsulated in the data-link frame or both of the address of the data-link frame as well as the port number of the IP packet encapsulated in the data-link frame. In one particular embodiment, the IP packet is a UDP packet. In one particular embodiment, the data-link layer broadcast data is for service discovery.

According to one of the embodiments of the present invention, the first gateway distributes data-link layer broadcast data received through the at least one tunnel and originated from the second host or one or more hosts or nodes from the second network.

According to one of the embodiments of the present invention, one or more tunnels are used to carry broadcast data while other tunnels are not used. Alternatively, one or more tunnels cannot be used to carry broadcast data while other tunnels can be used. Alternatively, a policy is used to select which tunnel(s) can be used to carry broadcast data. Alternatively, a policy is used to select which tunnel(s) cannot be used to carry broadcast data. In one particular embodiment, there are at least two tunnels used to transmit broadcast data and the two tunnels are bonded together.

According to one of the embodiments of the present invention, when a second gateway receives broadcast data from the first gateway, the second gateway forwards the broadcast data to one or more other gateways through one or more other tunnels.

DETAILED DESCRIPTION

The ensuing description provides preferred exemplary embodiment(s) and exemplary embodiments only, and is not intended to limit the scope, applicability or configuration of the invention. Rather, the ensuing description of the preferred exemplary embodiment(s) and exemplary embodiments will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "secondary storage" and "main memory" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data. A machine-readable medium can be realized by virtualization, and can be a virtual machine readable medium including a virtual machine readable medium in a cloud-based instance.

Furthermore, embodiments may be implemented by hardware, software, firmware, middleware, microcode, hardware description languages, or any combination thereof. When implemented in software, firmware, middleware or microcode, the program code, code segments or instruction codes to perform the necessary tasks may be stored in a machine readable medium such as storage medium. A processing unit(s) may perform the necessary tasks. A processing unit(s) can be a CPU, an ASIC semi-conductor chip, a semi-conductor chip, a logical unit, a digital processor, an analog processor, a FPGA or any processor that is capable of performing logical and arithmetic functions. An instruction code may represent a procedure, a function, a subprogram, a program, a routine, a subroutine, a module, a software package, a class, or any combination of instructions, data structures, or program statements. An instruction code may be coupled to another instruction code or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. A processing unit(s) can be realized by virtualization, and can be a virtual processing unit(s) including a virtual processing unit in a cloud-based instance.

A network interface can be a virtual network interface, including a virtual network interface in a cloud based instance.

FIG. 1 illustrates system 100 adapted according to one of the embodiments of the present invention. System 100 includes multiple sites 102 and 104, which each comprise at least one communications gateway 106 and 108. Communications gateway 106 and 108 may be embodied as multi WAN routers which support aggregating the bandwidth of multiple Internet connections, as single WAN which support aggregating the bandwidth of multiple Internet connections and/or as single WAN which does not support aggregating the bandwidth of multiple Internet connections. Communications gateway 106 and 108 are connected over network 110. Network 110 may comprise a local area network (LAN), metropolitan area network (MAN), wide area network (WAN), wireless network, the public switched telephone network (PSTN), the Internet, an intranet, an extranet, etc.

Site 102 and communication gateway 106 may comprise M connections 112, and site 104 and communication gateway 108 may comprise N connections 114. Connections 112 and 114 are data connections for communicating information within network 110 between sites 102 and 104. In the illustrated embodiment, M is equal to 3 and N is equal to 2; however, these values may vary according to desired routers and configurations. M connections 112 and N connections 114 may have similar or differing bandwidth capabilities. Further, connections 112 and 114 may comprise different types of WAN connections, such as a Wi-Fi, cable, DSL, T1, 3G, 4G, satellite connections, and the like. It is also noted that site 102 and site 104 may be thought of as both a sender and receiver, and discussions regarding the functionality of either site may be implemented on the other site. In other words, system 100 may be implemented as a symmetrical network. N connections 14 are established through one or more of the plurality of network interfaces 606.

Communication gateways 106 and 108 are connected through M×N tunnels 116. M×N tunnels 116 are established using M connections 112 and N connections 114. There is no limitation on the value of M or N. In one variant, the number of tunnels established between communication gateways 106 and 108 can be more or fewer than M times N. For illustration, if M is equal to 3 and N is equal to 2, the number of tunnels established between communication gateways 106 and 108 can be one, ten or any number. Preferably, the number of tunnels established should be within the computing and networking resources that communication gateways 106 and 108 are able to operate with impacting performance negatively.

Server 121 is capable of providing a service to at least one host. The service may include multimedia streaming, data distribution, content distribution, multimedia data collection, video broadcasting, video multicasting, audio broadcasting, audio multicasting, game streaming, game hosting, application hosting, application distribution, encoding, decoding, directory, and any other service that a host may need. Server 121 broadcasts its service capability to hosts and nodes that are located within the same local network, such as site 104, by sending out service advertisement 131 to the local network. When communication gateway 108 receives service advertisement 131 from server 121 through a network interface connecting to the local network, it forwards service advertisement 132 to communication gateway 106 using one of N connections 114 established over another network interface if it determines to. Service advertisement 132 is based on service advertisement 131. One or more packets containing service advertisement 132 reaches communication gateway 106 through using one of M×N tunnels 116 and one of M connections 112.

When communication gateway 106 receives service advertisement 132, it forwards another service advertisement 133 to one or more local area network it connects to. Optionally, communication gateway 106 determines whether or not to forward the service advertisement based on one or more conditions or polices. Service advertisement 133 is based on service advertisement 132. When a host or a node, such as display 122 wants to subscribe to the service, display 122 sends response 141 to server 121. Response 141 may contain information necessary for subscribing to the service advertised in service advertisement 133, including identification information, security information, service request information, service termination information, location information and payment information. Display 122 may transmit response 141 as a unicast message, a multicast message or a broadcast message.

Communication gateway 106 receives response 141 as response 141 is either designated for server 121 or multicast/broadcast to the same local network that communication gateway 106 connects to. After communication gateway 106 receives response 141, it forwards response 142 to communication gateway 108. One or more packets containing response 142 reaches communication gateway 108 through using one of M×N tunnels 116 and one of M connections 112 and one of N connections 114. Response 142 is based on response 141.

When communication gateway 104 receives response 142, it forwards another response 143 to server 121. Response 143 is based on response 142. Server 121 can then process response 143 to determine the suitable actions to be performed for display 122.

Similarly, display 122 may broadcast service request. When communication gateway 106 receives the service request through a network interface that is connecting to site 102, it determines whether or not to forward the service request to communication gateway 108 based on at least one condition. If communication gateway 106 determines to forward the service request, it forwards the service request through one of the M×N tunnels established between communication gateways 106 and 108. When communication gateway 108 receives the service request, it broadcasts the service request to site 104. Alternatively, communication gateway 108 only forwards the service request to server 121 if communication gateway 108 is able to recognize that server 121 should be recipient of the request. Alternatively, communication gateway 108 does not broadcast the service request to site 104 or forwards the service request to server 121 if it determines to. This may happen if communication gateway 108 cannot confirm the authenticity of the service request, cannot confirm the integrity of service request, does not have resources, determines that the service request fails as condition, determines that the service request fails as condition, determines that the service request has not satisfied at least one condition or determines that a policy is satisfied.

FIG. 6 is an illustrative block diagram of a communications gateway, such as communication gateway 108, according to one of the embodiments of the present invention. Communications gateway 108 comprises processing unit 602, main memory 603, system bus 604, secondary storage 605, and plurality of network interfaces 606. Processing unit 602 and main memory 603 are connected to each other directly. System bus 604 connects processing unit 602 directly or indirectly to secondary storage 605, and plurality of network interfaces 606. Using system bus 504 allows communication gateway 106 to have increased modularity. System bus 604 couples processing unit 602 to secondary storage 605, and plurality of network interfaces 606. System bus 604 can be any of several types of bus structures including a memory bus, a peripheral bus, and a local bus using any of a variety of bus architectures. Secondary storage 605 stores program instructions for execution by processing unit 602. Secondary storage 605 further stores condition(s) for deciding whether broadcast data should be forwarded through the plurality of network interfaces 606 according to one of the embodiments. In one of the embodiments, the block diagram of FIG. 6 can also represent the system of communication gateway 106.

FIG. 2A is a flow-chart illustrating a process showing how communication gateway 108 forwards service advertisement 132 in details according to one of the embodiments.

When communication gateway 108 receives a frame or packet containing broadcast data at step 201, processing unit 602 determines whether the broadcast data satisfies at least one condition at step 202. The broadcast data can be a service advertisement, a service request, and a response to a service request, a response to a service advertisement, a presence indicator, a message, or any kind of data that are destined for more than one recipient. For easy reading, broadcast data here also refers to multicast data, such that this invention also applies to multicast data. Unless specifically stated, broadcast data is also considered as multicast data hereunder.

When the broadcast data has satisfied the at least one condition at step 202, communication gateway 108 then forwards the broadcast data at step 203. If the broadcast data has not satisfied the at least one condition at step 202, communication gateway 108 then does not forward any broadcast data at step 204.

Step 202 is used to filter out broadcast data that is not intended to be forwarded to communication gateway 106. Without filtering out unwanted broadcast data, network capacity and resources can be consumed by the unwanted broadcast data significantly. There could be one or more conditions to determine what kinds of broadcast data can be forwarded. For illustration purpose, in one example, a condition is to only forward Bonjour protocol broadcast data. Communication gateway 108 only forwards broadcast data using Bonjour protocol to communication gateway 106. Communication gateway 108 examines the destination IP address and port number of IP packets it receives to determine whether the IP packets hold Bonjour protocol broadcast data. For example, the port number for Bonjour protocol is 5353 and the transmission protocol can be TCP or UDP.

In another illustration, there are two conditions. The first condition is to allow video streaming broadcast data based on the source IP address of the broadcast data and the second condition is to allow broadcast data used for management based on the content carried by the broadcast data. When communication gateway 108 intercepts or receives a frame or packet containing broadcast data, communication gateway 108 examines the source address of the broadcast data, port number of the broadcast data if the broadcast data is sent using Internet Protocol, and/or the content of broadcast data by using content examination techniques, such as deep packet inspection, and header of the content to determine whether the broadcast data satisfy any of the two conditions.

According to one of the embodiments of the present invention, a condition is stored by communication gateway 108 in secondary storage 605. Alternatively, the condition is retrieved from a remote server including a server stored in an intranet, extranet, a third-party service provider, a cloud computing service provider or a virtualized server.

FIG. 2B is a flow-chart illustrating a process showing how communication gateway 108 forwards service advertisement 132 in details according to one of the embodiments. The difference between FIG. 2A and FIG. 2B is that step 203 is replaced with step 205. At step 205, broadcast data is forwarded by a communication gateway according to at least one policy. A policy determines how communication gateway forwards broadcast data. For illustration purpose, a condition used at step 202 is based on port number of the broadcast protocol of the broadcast data. The first policy step up by an administrator or the manufacturer of communication gateway 108 at step 205 is to allowed broadcast data be transmitted through M×N tunnels 116 only during a certain period of time, for example, before 8 a.m. and after 6 p.m. The second policy is to allow broadcast data be transmitted through M×N tunnels 116 by a host with a specified IP address anytime. Such that, the capacity of M×N tunnels 116 is not consumed by broadcast data during office hour while broadcast data belonging to the host with the specified IP address still passes through M×N tunnels 116 regardless of the time. The transmission of the broadcast data to or by the host is then not affected by the first condition.

According to one of the embodiments of the present invention, a policy used at step 205 is based on the capacity of M×N tunnels 116. When the available capacity of M×N tunnels 116 has used to a threshold, broadcast data is not transmitted through M×N tunnels 116 in order to preserve capacity of M×N tunnels 116 even the condition at step 202 is satisfied. In one variant, instead of not blocking all broadcast data, a portion of the broadcast data is still allowed to be transmitted through M×N tunnels 116. For illustration, half of broadcast data is dropped by a communication gateway when thirty percent of bandwidth capacity of M×N tunnels 115 has already been used by other non-broadcast data traffic.

According to one of the embodiments of the present invention, a policy used at step 205 is to determine which one or more tunnels of M×N tunnels 116 is used to transmit broadcast data. For illustration purpose, a policy is set to forward Bonjour Protocol based broadcast data through all M×N tunnels 116 and to forward broadcast Address Resolution Protocol (ARP) messages through one of M×N tunnels 116. This policy may help to allow Bonjour Protocol based broadcast data be delivered faster than the broadcast ARP messages. This implies that Bonjour Protocol based broadcast data has as higher priority over broadcast ARP messages.

According to one of the embodiments of the present invention, the policy is stored by communication gateway 108 in secondary storage 605. Alternatively, the policy is retrieved from a remote server including, a server stored in an intranet, extranet, a third party service provider, a cloud computing service provider or a virtualized server.

FIG. 3A, FIG. 3B, FIG. 3C and FIG. 3D illustrate structures of broadcast data at different stages of the processes in FIG. 2. According to one of the embodiments of the present invention illustrated in FIG. 3A, when server 121 first sends out broadcast data 301, such as service advertisement 131, broadcast data 301 is contained in IP packet 302, a network layer packet, and IP packet 302 is contained in Ethernet frame 303, a data-link layer frame. After communication gateway 108 has received Ethernet frame 303 in step 201, processing unit 602 determines whether broadcast data 301 satisfies at least one condition in step 202. In one variant, in step 202, processing unit 602 only examines the port number of IP packet 302 to determine whether broadcast data should be forwarded or not. In one variant, in step 202, processing unit 602, according to the condition(s), examines Ethernet frame 303 to determine whether broadcast data should be forwarded or not. In one variant, in step 202, processing unit 602, according to the condition(s), examines broadcast data 301 to determine whether broadcast data should be forwarded or not. In one variant, processing unit 602, according to the condition(s), examines two or all of IP packet 302. Ethernet frame 303 and broadcast data 301 to determine whether broadcast data should be forwarded or not. The more detailed examinations are carried out, the lower probability that communication gateway 108 forwards unnecessary broadcast data or forgery data to communication gateway 106. The fewer detailed examinations are carried out; the lower computing resources are required.

When communication gateway 108 forwards broadcast data 301 to communication gateway 106, there are two embodiments how communication gateway 108 forwards broadcast data 301.

The first embodiment is that communication gateway 108 encapsulates Ethernet frame 303 in encapsulating IP packet(s) 304 as illustrated in FIG. 3B and then transmits encapsulating IP packet(s) 304 to communication gateway 106. After communication gateway 106 has received encapsulating IP packet(s) 304, it decapsulates encapsulating IP packet(s) 304 to retrieve Ethernet frame(s) 303 and then broadcasts Ethernet frame(s) 303 to the local area network(s) it connects to. Hosts and nodes in the local area network(s) can then determine whether to respond to broadcast data 301 contained in IP packet(s) 302. One of the benefits of this embodiment is that communication gateway 108 directly encapsulates Ethernet frame(s), such that communication gateway 106 and 108 together work act as an Ethernet bridge. Another one of the benefits of this embodiment is not to involve routing. This greatly reduces the load of communication gateways 106 and 108. Another benefit is to support multiple network layer protocols, such as IP, IPS, and SNA. Therefore broadcast data 301 can be encapsulated by network layer protocols, including IP.

In one variant, the first embodiment is used when communication gateway 108 and communication gateway 106 are connected through a layer two virtual private networks (L2VPN) technology. In one variant, communication gateway 106 uses Ethernet frame(s) 305 to broadcast IP packet (s) 302, instead of using Ethernet frame(s) 303, as illustrated in FIG. 3D. The major difference between Ethernet frame 303 and Ethernet frame 305 is the source address of the Ethernet frame. The source address of Ethernet frame 305 is the Ethernet address of communication gateway 106.

The second embodiment is to encapsulate IP packet(s) 302 in encapsulating IP packet(s) 304 as illustrated in FIG. 3C. As communication gateway 108 receives Ethernet frame (s) 303 from server 121, communication gateway 108 retrieves IP packet(s) 302 from Ethernet frame(s) 303 and then transmit encapsulating IP packet(s) 304 to communication gateway 106. After communication gateway 106 has received encapsulating IP packet(s) 304, it decapsulates encapsulating IP packet(s) 304 to retrieve IP packet(s) 302, then broadcasts IP packet(s) 302 to the local area network(s) it connects to. Hosts and nodes in the local area network(s) can then determine whether or not to respond to broadcast data 301 contained in IF packet(s) 303. One of the benefits of this embodiment is that size of encapsulating IP packet(s) 304 is smaller than the site of encapsulating IP packet(s) 304 in the first embodiment illustrated in FIG. 3B, because there is no need to contain Ethernet frame 303. Another benefit is that transmission is not bound by limitation of Ethernet protocol or other data link network protocols. For example, the round trip time limit of Ethernet can be avoided in this embodiment.

In one variant, the second embodiment is used when communication gateway 108 and communication gateway 106 are connected through a layer three tunnel; such that the local area networks connected to communication gateway 106 and 108 respectively are being considered as in the same virtual private network (VPN).

According to one of the embodiments of the present invention, M×N tunnels 116 are established by communication gateways 106 and 108 using one of layer two virtual private network (L2VPN) protocols. Broadcast data that satisfies at least one condition can be transmitted through one or more of M×N tunnels 116. There are myriad ways for communication gateway 108 to establish L2VPN, including using Multiprotocol Label Switching (MPLS) Asynchronous Transfer Mode (ATM) and Frame Relay.

According to one of the embodiments of the present invention, M×N tunnels 116 are established by communication gateways 106 and 108 using one of IP virtual private network protocols. Broadcast data that satisfies at least one condition can be transmitted through one or more of M×N tunnels 116. There are myriad ways for communication gateway 108 to establish IP based M×N tunnels 116, including using Internet Protocol Security (IPsec), Transport Layer Security (SSL/TLS), Secure Shell (SSH), PepVPN and SpeedFusion.

According to one of the embodiments of the present invention, regardless whether M×N tunnels 116 are established using layer two VPN protocols or layer three VPN protocols, broadcast data is transmitted using One or more the M×N tunnels 116. In one variant, when one or more of M×N tunnels is broken and cannot be used, communication gateways 106 and 108 stop using the broken tunnels to transmit broadcast data. In one variant, when an IP packet(s) containing broadcast data is dropped or lost in of M×N tunnels 116, the transmitting communication gateway will retransmit the broadcast data in another IP packet(s) through another of M×N tunnels 116. In one variant, duplicated broadcast data is transmitted by communication gateway 108 using a plurality of M×N tunnels 116. The receiving communication gateway 106 forwards the first received broadcast data of the duplicated broadcast data to the local area network(s) it connects to and discards others of the duplicated broadcast data. This results in not only higher availability, but also faster delivery.

In one variant, only a first group of M×N tunnels 116 are used to transmit broadcast data and other non-first groups M×N tunnels 116 are not used to transmit broadcast data. Unicast data that are responses to the broadcast data are not restricted to be transmitted through the first group or any of M×N tunnels 116 unless the administrator or manufacturer of the transmitting communication gateway explicitly created network policies to do so. The use of the first group allows network traffic management for the broadcast data. For illustration purpose, an administrator can assign higher priorities to broadcast data, such that broadcast data can only be transmitted using one or more high speed M×N tunnels 116, in another illustration, a manufacture can pre-configure a transmitting communication gateway, such as communication gateway 108, to use a low-cost access link to transmit broadcast data and therefore only tunnels being carried by the low-cost access link belong to the first group of M×N tunnels 116.

In one variant, a second group of M×N tunnels 116 are not used to transmit broadcast data and other non-first group M×N tunnels 116 are allowed to be used for transmitting the broadcast data. To restrict a few tunnels of M×N tunnels 116 from being used ensures that the broadcast data does not consume bandwidth of the few tunnels, which could be reserved for other network traffic.

The policies or configuration to determine which of M×N tunnels 116 can be used or are not allowed to carry broadcast data are stored in secondary storage 605 of communication gateways 108. The policies or configuration can also be stored in a secondary storage of communication gateway 106. In one variant, the policies or configurations can be retrieved by a remote server, including a server stored in an intranet, extranet, a third-party service provider, a cloud computing service provider or a virtualized server.

FIG. 4 illustrates system 400 adapted according to embodiments configured to allow broadcast data transmitted by communication gateway 106 to be transmitted to communication gateway 401 and broadcast data transmitted by communication gateway 401 to be transmitted to communication gateway 106 through communication gateway 108. System 400 is configured as a hub architecture, such that communication gateway 108 acts as the broadcast data hub. As in FIG. 1, communication gateways 106 and 108 are connected through M×N tunnels 116. Communication gateway 106 has one access link 112-1 to connect to interconnected network 110. Access link 112-1 carries two M×N tunnels 116 inside. Communication gateway 301 has two access links 402-1 and 402-2 to connect to interconnected network 110. Communication gateways 108 and 401 are connected through Y×Z tunnels 411. There is no tunnel directly connecting communication gateways 106 and 401.

When a server, located in a local area network that communication gateway 106 is connecting to, transmits broadcast data, communication gateway 106 forwards the broadcast data to communication gateway 108 if the broadcast data satisfies at least one first condition. When communication gateway 108 receives the broadcast data, it will perform two tasks. The first task is to forward the broadcast data to the local area network it connects to, as discussed in other embodiments. The second task is to decide whether to forward the broadcast data to communication gateway 401. According to one of the embodiments of the present invention, processing unit 602 of communication gateway 108 makes the decision to forward or not to forward the received broadcast data according to at least one second condition. The at least one second condition can be the same as, based on, or different from the at least one first condition at communication gateway 106. The at least one second condition is similar to the at least one condition at step 205. Therefore, when communication gateway 108 receives broadcast data from communication gateway 106, communication gateway 108 goes through the same step in FIG. 2A. In one variant, communication gateway 108 forwards the broadcast data to communication gateway 401 without deciding whether the broadcast data satisfies at least one second condition and it forwards all broadcast data originated from communication gateway 106 to communication gateway 401.

In one variant, the second task deciding whether to forward the broadcast data to communication gateway 401 is based on at least one second policy. The at least one second policy is similar to the at least one policy at step 205. Therefore, when communication gateway 108 receives broadcast data from communication gateway 106, communication gateway 108 goes through the same step in FIG. 2B.

The benefits of using hub architecture as illustrated in FIG. 4 and using a plurality of tunnels include centralization of broadcast data distribution and higher availability as communication gateway is capable of duplicating broadcast data and transmitting broadcast data through a plurality of tunnels. When one of the plurality of tunnels is not working properly, such as experimenting large number of packet drops, the remaining tunnels can still carry the broadcast data between two communication gateways. Also, for illustration, if access-link 114-2 is not performing satisfactorily, communication gateway 10 can still rely on access-link 114-1 to receive from communication gateway 106 and forward the broadcast data to communication gateway 401. Centralization of broadcast data distribution, for example, allows administrator of the system 400 to control what can be and what cannot be distributed in system 400 by controlling communication gateway 108, which is acting as a hub.

FIG. 5 illustrates system 500 adapted according to embodiments configured to allow broadcast data transmitted by communication gateway 106 to be transmitted to communication gateway 401 and broadcast data transmitted by communication gateway 401 to be transmitted to communication gateway 106 through communication gateway 108 as in system 400. Furthermore, communication gateways 106 and 401 can transmit and receive broadcast data to and from each other directly through tunnels 501 without passing through communication gateway 108. Therefore, system 500 is configured as a star architecture.

The benefits of star architecture over hub architecture for transmitting and receiving broadcast data includes reducing the time and computing resources required by using a hub to forward broadcast data. However, additional tunnels are required to be established among all the communication gateways, such as tunnels 501.

According to one of the embodiments of the present invention, a communication gateway forwards and/or retransmits broadcast data when tunnels between other communication gateways are broken. Using FIG. 5 for illustration, broadcast data originated from a first server, which uses communication gateway 401 as a gateway to distribute broadcast data, reaches other hosts or nodes accessible through tunnels 411 via communication gateway 108 and through tunnels 501 via communication gateway 106 respectively. If all tunnels 501 are broken, broadcast data from the first server cannot reach communication gateway 106 through tunnels 501. Communication gateway 401 then alerts communication gateway 108 about broken tunnels 501. Communication gateway 108 then forwards broadcast data originated from the first server to communication gateway 106 through tunnels 116. In one variance, when all tunnels 501 are broken and one of tunnels 116 is broken, communication gateway 108 is still able to use remaining tunnels of tunnels 116 to forward broadcast data originated from the first server to communication gateway 106.

According to one of the embodiments of the present invention, broadcast data are transmitted using balancing technique. Using FIG. 1 for illustration, broadcast data belonging to a first data stream originated from server 121 are distributed among all M×N tunnels 116 to reach communicate gateway 106. This avoids reliance on one particular tunnel.

BRIEF DESCRIPTION OF DRAWINGS

FIG. 1 illustrates a system adapted according to one of the embodiments of the present invention;

FIG. 2A is a flow-chart illustrating a process showing how a communication gateway forwards a service advertisement according to one of the embodiments;

FIG. 3A illustrates structure of broadcast data according to one of the embodiments;

FIG. 3B illustrates structure of broadcast data according to one of the embodiments;

FIG. 6 is an illustrative block diagram of as communications gateway according to one of the embodiments of the present invention.

Figure 2B:
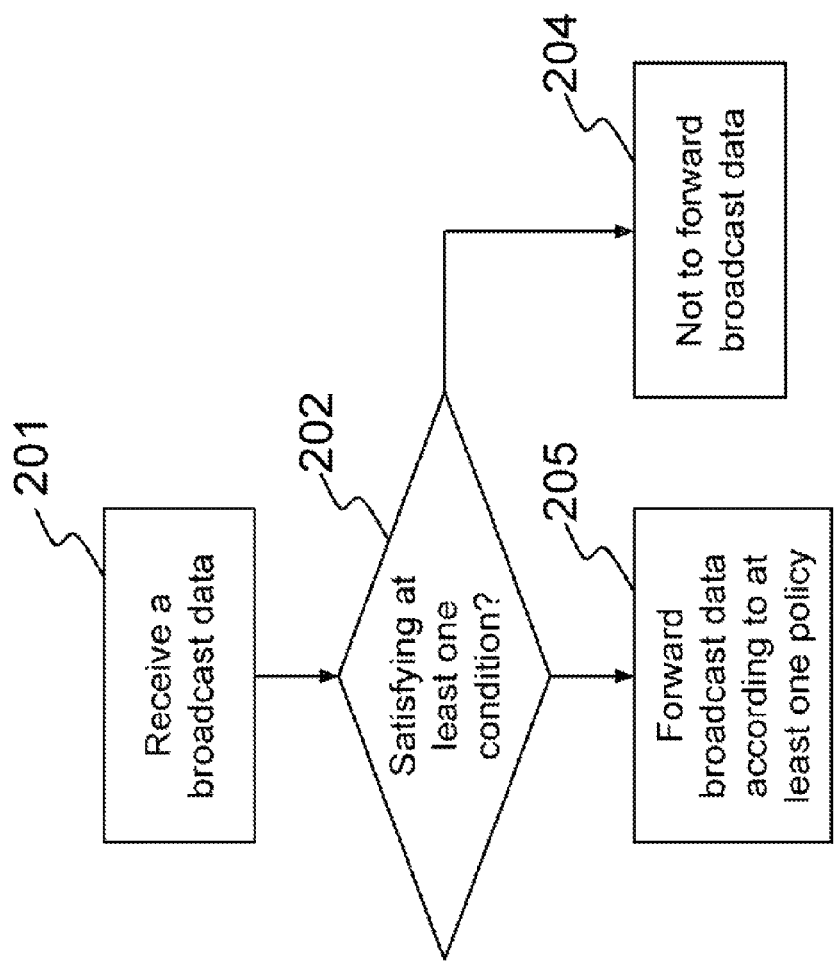
FIG. 2B is a flow-chart illustrating a process showing how a communication gateway forwards a service advertisement according to one of the embodiments.
Figure 3C:
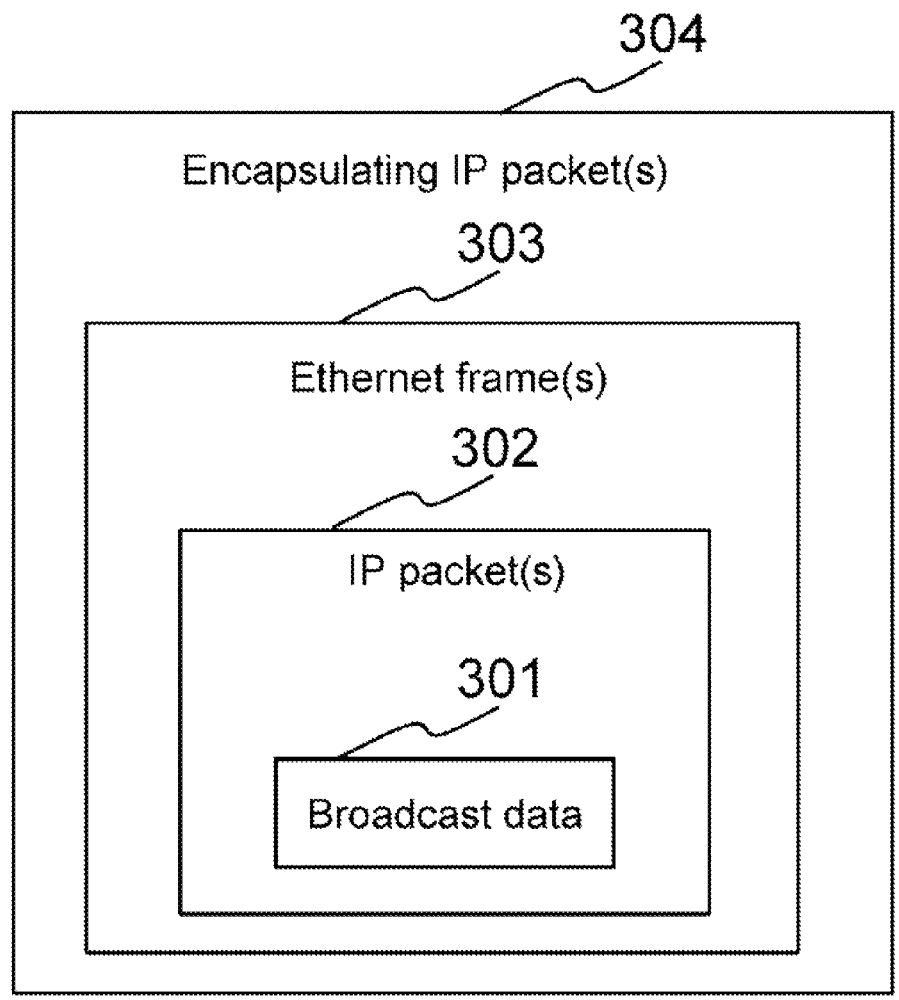
FIG. 3C illustrates structure of broadcast data according to one of the embodiments.
Figure 3D:
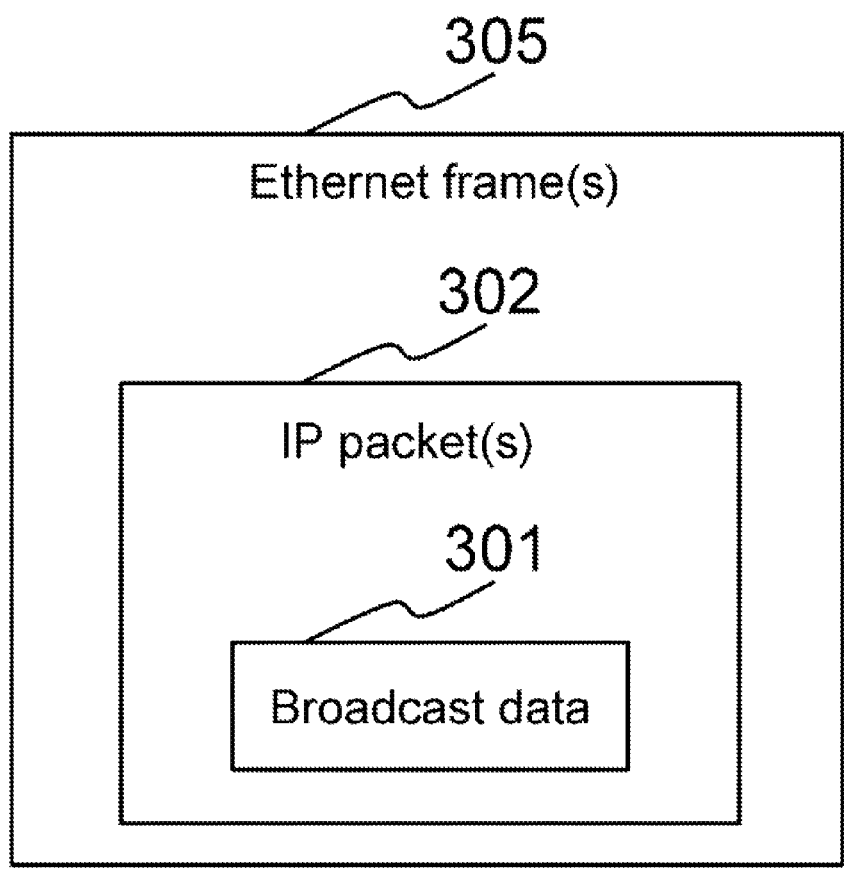
FIG. 3D illustrates structure of broadcast data according to one of the embodiments.
Figure 4:
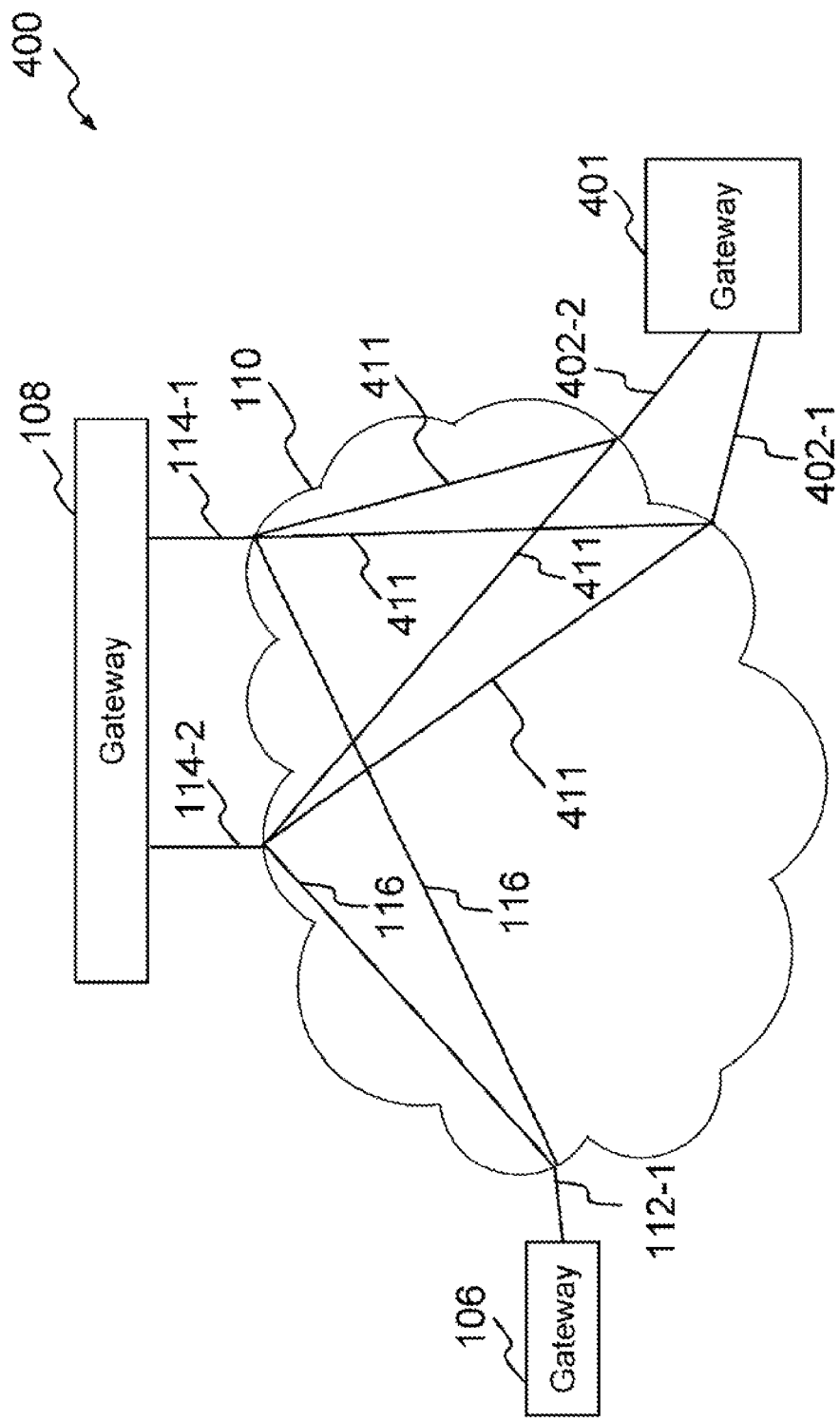
FIG. 4 illustrates a system for transmitting broadcast data adapted according to one of the embodiments of the present invention.
Figure 5:
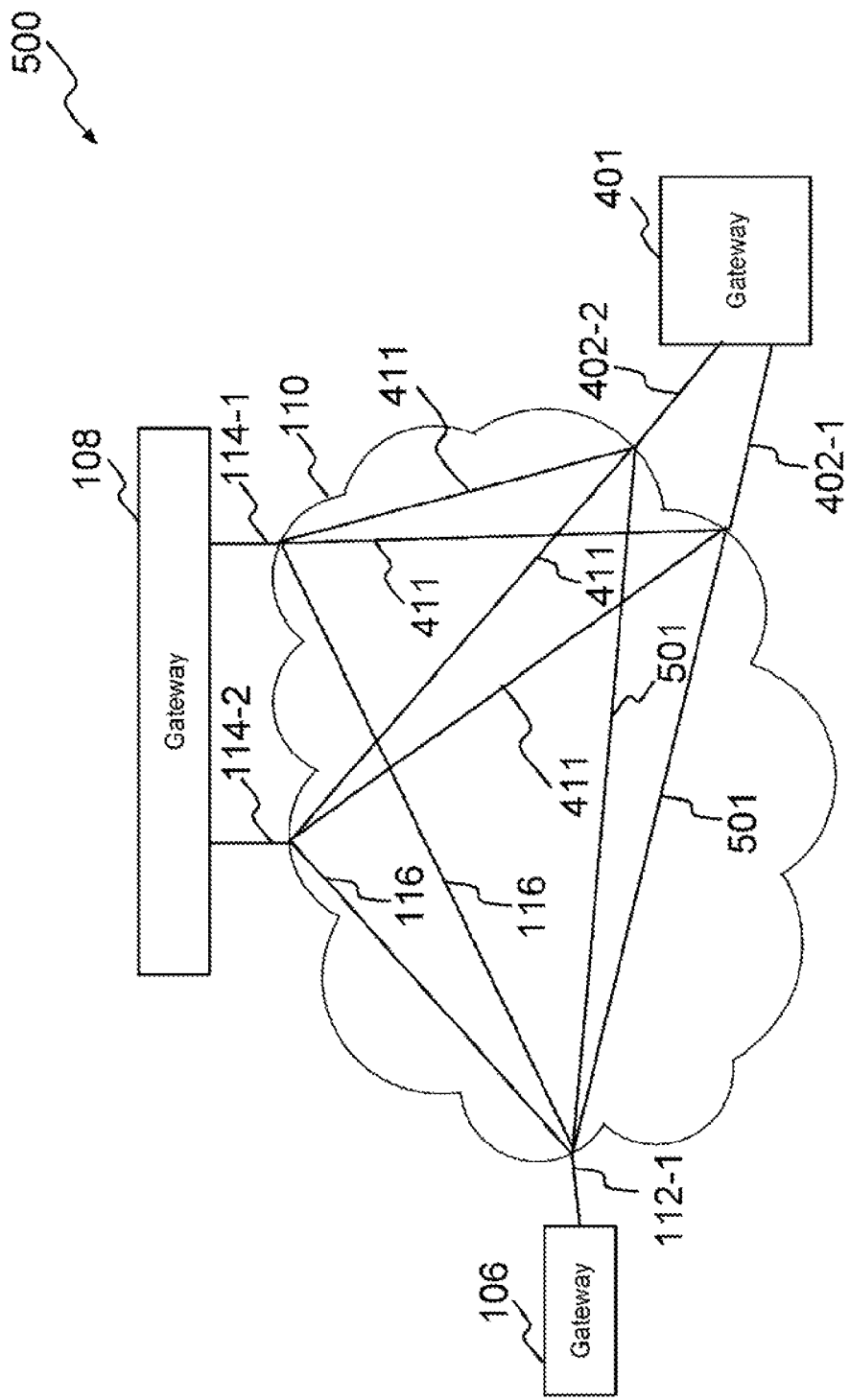
FIG. 5 illustrates a system for transmitting broadcast data adapted according to one of the embodiments of the present invention.

The invention claimed is:

1. A method of transmitting broadcast data at a first communication gateway, comprising:
(a) establishing a plurality of tunnels with a second communication gateway; receiving broadcast data through a first network interface from a host or a server; wherein when the broadcast data is received from a host, the broadcast data is a service request, a response to a service advertisement, or a message; wherein the service request is displayed at a first display; wherein when the broadcast data is received from a server, the broadcast data is a service advertisement, a response to a service request, a presence indicator, or a message;

(b) determining whether the broadcast data satisfies at least one condition; wherein the at least one condition is based on source address of the broadcast data, and/or port number of the broadcast data of the broadcast data;

(c) encapsulating the broadcast data in at least one encapsulating packet;

(d) forwarding the broadcast data through at least one tunnel of the plurality of tunnels and through a second network interface to the second communication gateway if the broadcast data satisfies the at least one condition; wherein the at least one tunnel is selected according to at least one policy; wherein the at least one policy is based on capacity of the at least one tunnel, time, and/or identity of the host; wherein when the policy is based on time; the broadcast data is transmitted through the at least one tunnel only during a certain period of time; wherein a priority is assigned to each of the at least one policy;

wherein the at least one encapsulating packet is encapsulated by the second communication gateway to retrieve the broadcast data; and wherein the broadcast data is distributed by the second communication gateway to a second network.

2. According to the method of claim 1, wherein the broadcast data is encapsulated in an Internet Protocol packet when receiving through the first network interface.

3. According to the method of claim 1, wherein the broadcast data is encapsulated in an Ethernet datagram when receiving through the first network interface.

4. According to the method of claim 1, wherein the server provides at least one service to the host, the at least one service including multimedia streaming, data distribution, content distribution, multimedia data collection, video broadcasting, video multicasting, audio broadcasting, audio multicasting, game streaming, game hosting, application hosting, application distribution, encoding, decoding, and directory.

5. According to the method of claim 1, wherein when the policy is based on capacity of the at least one tunnel: broadcast data is not transmitted or partially transmitted through the at least one tunnel when the capacity has been used to a threshold.

6. According to the method of claim 1, wherein the broadcast data satisfies the at least one condition when the broadcast data uses Bonjour protocol.

7. According to the method of claim 1, wherein when there is a plurality of tunnels, the tunnels are aggregated.

8. According to the method of claim 7, further comprising duplicating broadcast data.

9. According to the method of claim 1, herein when the policy is based on identity of the host: broadcast data is transmitted through the at least one tunnel if the broadcast data is received from a specific host.

10. According to the method of claim 1, wherein the broadcast data is originated from a host or a node, wherein the host or the node is at a third network and the broadcast data is forwarded by a third communication gateway of the third network.

11. A first communication gateway for transmitting broadcast data, comprising:
a plurality of network interfaces;
at least one processing unit;
at least one main memory;
at least one secondary storage storing program instructions executable by the at least one processing unit for:

(a) establishing a plurality of tunnels with a second communication gateway; receiving broadcast data through a first network interface from a host or a server; wherein when the broadcast data is received from a host, the broadcast data is a service request, a response to a service advertisement, or a message; wherein the service request is displayed at a first display; wherein when the broadcast data is received from a server, the broadcast data is a service advertisement, a response to a service request, a presence indicator, or a message;

(b) determining whether the broadcast data satisfies at least one condition; wherein the at least one condition is based on source address of the broadcast data, and/or port number of the broadcast data of the broadcast data;

(c) encapsulating the broadcast data in at least one encapsulating packet;

(d) forwarding the broadcast data through at least one tunnel of the plurality of tunnels and through a second network interface to the second communication gateway if the broadcast data satisfies the at least one condition; wherein the at least one tunnel is selected according to at least one policy; wherein the at least one policy is based on capacity of the at least one tunnel, time, and/or identity of the host; wherein when the policy is based on time; the broadcast data is transmitted through the at least one tunnel only during a certain period of time; wherein a priority is assigned to each of the at least one policy;

wherein the at least one encapsulating packet is encapsulated by the second communication gateway to retrieve the broadcast data; and wherein the broadcast data is distributed by the second communication gateway to a second network.

12. According to the first communication gateway of claim 11, wherein the broadcast data is encapsulated in an Internet Protocol packet when receiving through the first network interface.

13. According to the first communication gateway of claim 11, wherein the broadcast data is encapsulated in an Ethernet datagram when receiving through the first network interface.

14. According to the first communication gateway of claim 11, wherein the server provides at least one service to the host, the at least one service including multimedia streaming, data distribution, content distribution, multimedia data collection, video broadcasting, video multicasting, audio broadcasting, audio multicasting, game streaming, game hosting, application hosting, application distribution, encoding, decoding, and directory.

15. According to the first communication gateway of claim 11, wherein when the policy is based on capacity of the at least one tunnel: broadcast data is not transmitted or partially transmitted through the at least one tunnel when the capacity has been used to a threshold.

16. According to the first communication gateway of claim 11, wherein the broadcast data satisfies the at least one condition when the broadcast data uses Bonjour protocol.

17. According to the first communication gateway of claim 11, wherein when there is a plurality of tunnels, the tunnels are aggregated.

18. According to the first communication gateway of claim 17, wherein the at least one secondary storage further storing program instructions executable by the at least one processing unit for duplicating broadcast data.

19. According to the first communication gateway of claim 17, wherein when the policy is based on identity of the host: broadcast data is transmitted through the at least one tunnel if the broadcast data is received from a specific host.

20. According to the first communication gateway of claim 11, wherein the broadcast data is originated from a host or a node, wherein the host or the node is at a third network and the broadcast data is forwarded by a third communication gateway of the third network.

* * * * *